United States Patent [19]
Preis

[11] Patent Number: 5,380,134
[45] Date of Patent: Jan. 10, 1995

[54] MACHINE TOOL
[75] Inventor: Josef Preis, Amöneburg, Germany
[73] Assignee: Hevligenstaedt GmbH & Co. KG, Giessen, Germany
[21] Appl. No.: 143,789
[22] Filed: Nov. 1, 1993
[30] Foreign Application Priority Data
Oct. 30, 1992 [DE] Germany .............. 4236648
[51] Int. Cl.6 .................................. B23C 1/06
[52] U.S. Cl. ........................ 409/235; 409/212
[58] Field of Search ............. 409/202, 212, 235, 241; 408/234
[56] References Cited
U.S. PATENT DOCUMENTS
2,913,963 11/1959 De Boer et al. .
3,233,521 2/1966 Ford .................................. 409/212

FOREIGN PATENT DOCUMENTS
868343 1/1953 Germany .
1962484 12/1969 Germany .
1652668 11/1971 Germany .
2143538 9/1982 Germany .

Primary Examiner—Daniel W. Howell
Attorney, Agent, or Firm—Evenson, McKeown, Edwards & Lenahan

[57] ABSTRACT

The invention is directed to a machine tool having a crossrail, which carries a tool unit and which is braced by at least one column. The column includes a bottom section and an upper section, which can be moved telescopically relative to the bottom section and on which the crossrail is attached from the top. The supporting bodies make it possible that the upper section sits firmly in multiple positions from the top on the bottom section.

7 Claims, 2 Drawing Sheets

MACHINE TOOL

FIELD OF THE INVENTION

The present invention relates to a machine tool with a vertically moveable crossrail, which has horizontal guideways and projects beyond a workpiece to be machined, which is held by at least one vertical column and on which a tool unit can be moved horizontally.

BACKGROUND OF THE INVENTION

Machine tools of the above kind are universally well-known and are useful. They can be, for example, a double column planar-type milling machine, wherein the crossrail is held by two columns or stands on both sides of the machine table. It can just as well be a milling or drilling machine with only one column, on which a crossrail, designed as an outrigger, is held.

In machine tools of the above kind the column has vertical guides on which the crossrail can be moved vertically. Thus, by moving the crossrail vertically the tool unit can be moved a small distance above the workpiece, so that, when machining the workpiece, the tool does not have to carry out any undesired large vertical lifting movements relative to the tool unit.

The drawback with the machine tools of the aforementioned kind of construction is that the vertical guides of the column or columns are relatively quite complicated and they introduce the risk of chatter, if during a machining operation the crossrail not reliably clamped on the vertical guides.

SUMMARY OF THE INVENTION

The present invention is directed to designing a machine tool of the aforementioned kind in such a manner that its crossrail can be fixed rigidly at different heights with as little technical complexity as possible.

This problem is solved according to the invention by firmly connecting the crossrail to an upper section of the column and by vertically moving the upper section of the column by means of a lifting mechanism and attaching to a bottom section of the column and by having means to shape-lockingly connect the upper section to the bottom section at at least two different heights.

According to the invention, the crossrail is no longer moved vertically on vertical guides. Rather it has as a column a leg, whose length is adjustable step-by-step, or two such legs. Therefore, the crossrail no longer transfers the forces acting on it by way of vertical guides to the column or columns, rather it is braced directly as in the case of a leg or two legs from the top on said leg or legs. Therefore, the machine tool is designed quite rigidly with relatively little technical complexity, thus resulting in high machining accuracy.

An embodiment of the invention whose construction is especially simple consists of at least one supporting body, which can be moved transversely to the longitudinal axis of the column, being attached to the upper section, said supporting body exhibiting on its side facing away from the upper section at least two step-like bearing surfaces, provided at different heights, and the bottom section for the supporting body having an upper support face, on which, depending on the position of the supporting body, the one or the other bearing surface of the supporting body or the upper part can be put. In such a design the crossrail can be fixed with ease at three different heights.

The rigidity and strength of the device is further increased when two supporting bodies, which can be moved transversely, are provided at right angles to the longitudinal axis of the lifting device and when the bottom section of the column exhibit correspondingly at least one support face at two radially opposite points.

The lifting device can be constructed in very different ways. For example, it can be a motor-driven spindle, which moves a lifting nut more or less far to the top in order to lift the crossrail. Since the lifting device has to brace and move said crossrail only when the crossrail is being adjusted, it does not have to transfer any high forces and can, therefore, be designed very simply. It is designed in an especially simple manner, when it is formed by a hydraulic piston-cylinder unit.

Other objects, advantages and features of the present invention will be more readily appreciated and understood when considered in conjunction with the following detailed description and drawings.

DESCRIPTION OF THE PREFERRED EMBODIMENT

Figure 1:
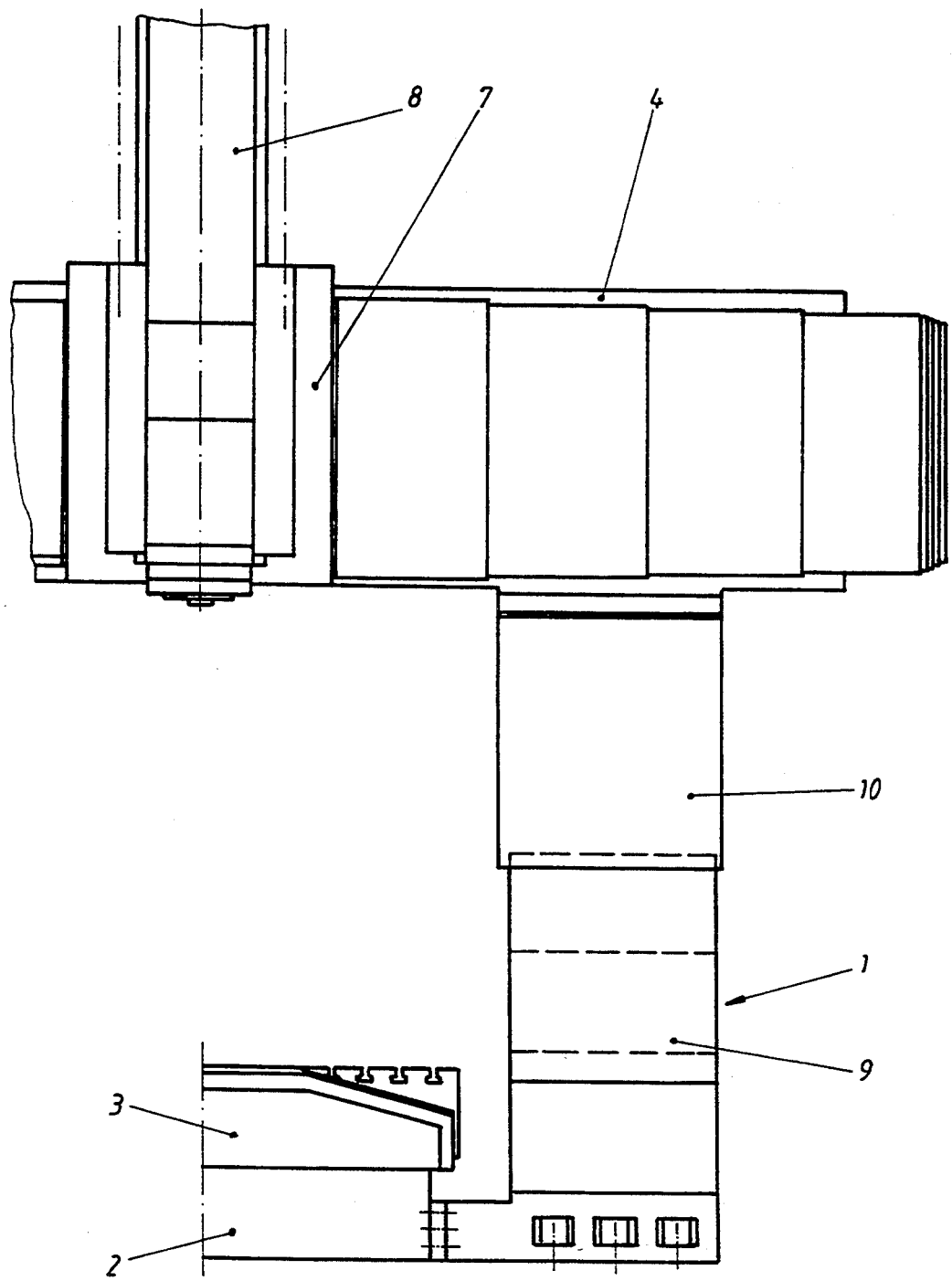
FIG. 1 is a schematic plan view of a subregion of a machine tool designed as a double column planar-type milling machine according to the present invention.
Figure 2:
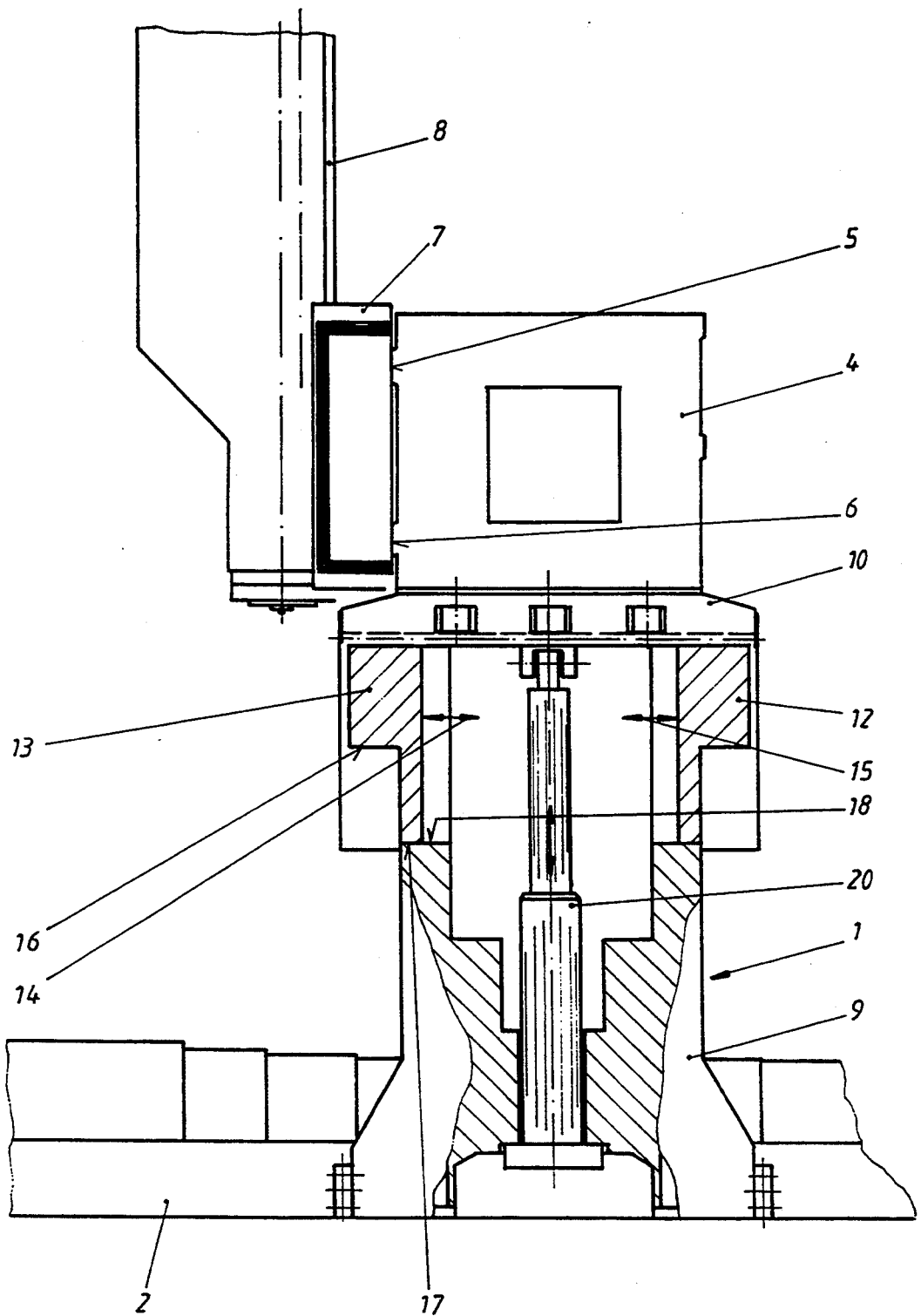
FIG. 2 illustrates a side view, partially cut away, of the subregion of the machine tool according to FIG. 1.

The machine tool of the present invention includes, in addition to a column 1, a machine table 3, which can be moved longitudinally on a machine bed 2. A crossrail 4, which carries a tool unit 7, which is designed as a milling unit and which can be moved horizontally with a ram 8 on horizontal guideways 5 and 6, which can be seen in FIG. 2, is mounted from the top on the column 1. The crossrail 4 is braced against the other side of the machine bed 2 (not shown in the drawing) by means of a column (not illustrated) which is identical to the column 1.

What is important for the invention is the design of this column 1. Column 1 includes a bottom section 9 and a telescoped upper section 10, which can be moved vertically and on which the crossrail 4 sits and is mounted from the top.

FIG. 2 shows that the upper section 10 has two supporting bodies 12 and 13, which can be moved in the radial direction, as illustrated by means of two double arrows 14, 15. As illustrated by reference to supporting body 13, the underside of the supporting bodies 12 and 13 has bearing surfaces 16 and 17 located at steps of different heights. In the illustrated position of the supporting body 13, said supporting body 13 stands up with its bearing surface 17 on an upper support face 18 of the bottom section 9. If the supporting body 13 is moved radially toward the inside and is lowered by the difference in height between the bearing surfaces 16, 17, then it stands up with the bearing surface 16 on the support face 18.

If the supporting bodies 12 and 13 are moved even further radially to the inside, then the upper section 10 can be put directly on the support face 18 of the bottom section 9.

To move the crossrail 4 vertically there is a hydraulic lifting device 20, which is designed as a piston-cylinder unit, is shown in FIG. 2, and is attached, on the one hand, in the bottom section 9, on the other hand to the upper section 10.

While there is shown and described certain specific structures embodying this invention for the purpose of clarity of understanding, the same is to be considered as illustrative in character, it being understood that only preferred embodiments have been shown and described. It will be manifest to those skilled in the art that certain changes, various modifications and rearrangements of the parts may be made without departing from the spirit and scope of the underlying inventive concept and that the same is not limited to the particular forms herein shogun and described except insofar as indicated in the scope of the appended claims.

What is claimed is:

1. A machine tool comprising a vertically moveable crossrail, which exhibits horizontal guideways and projects beyond a workpiece to be machined, which is held by at least one vertical column and on which a tool unit can be moved horizontally, wherein the crossrail is firmly connected to an upper section of the column; and the upper section of the column is moved vertically by means of a lifting mechanism and attached to a bottom section of the column; and it has means to shape-lockingly connect the upper section to the bottom section at at least two different heights.

2. The machine tool of claim 1 wherein one supporting body, which can be moved transversely to the longitudinal axis of the column, is attached to the upper section, wherein said supporting body exhibits on its side facing away from the upper section at least two step-like bearing surfaces, provided at different heights, and the bottom section for the column has an upper support face on which, depending on the position of the supporting body, the one or the other bearing surface of the supporting body or the upper part can be put.

3. The machine tool of claim 1 wherein there are two supporting bodies which can be moved transversely to the longitudinal axis of the lifting device, and the bottom section of the column exhibits correspondingly at least one support face on two radially opposite sides.

4. The machine tool of claim 1 wherein the lifting device is formed by means of a hydraulic Piston-cylinder unit.

5. The machine tool of claim 2 wherein there are two supporting bodies which can be moved transversely to the longitudinal axis of the lifting device, and the bottom section of the column exhibits correspondingly at least one support face on two radially opposite sides.

6. The machine tool of claim 2 wherein the lifting device is formed by means of a hydraulic Piston-cylinder unit.

7. The machine tool of claim 3 wherein the lifting device is formed by means of a hydraulic Piston-cylinder unit.

* * * * *